Feb. 18, 1936.  I. BENCOWITZ  2,031,403
SULPHUR BURNER
Filed March 12, 1932  2 Sheets-Sheet 1
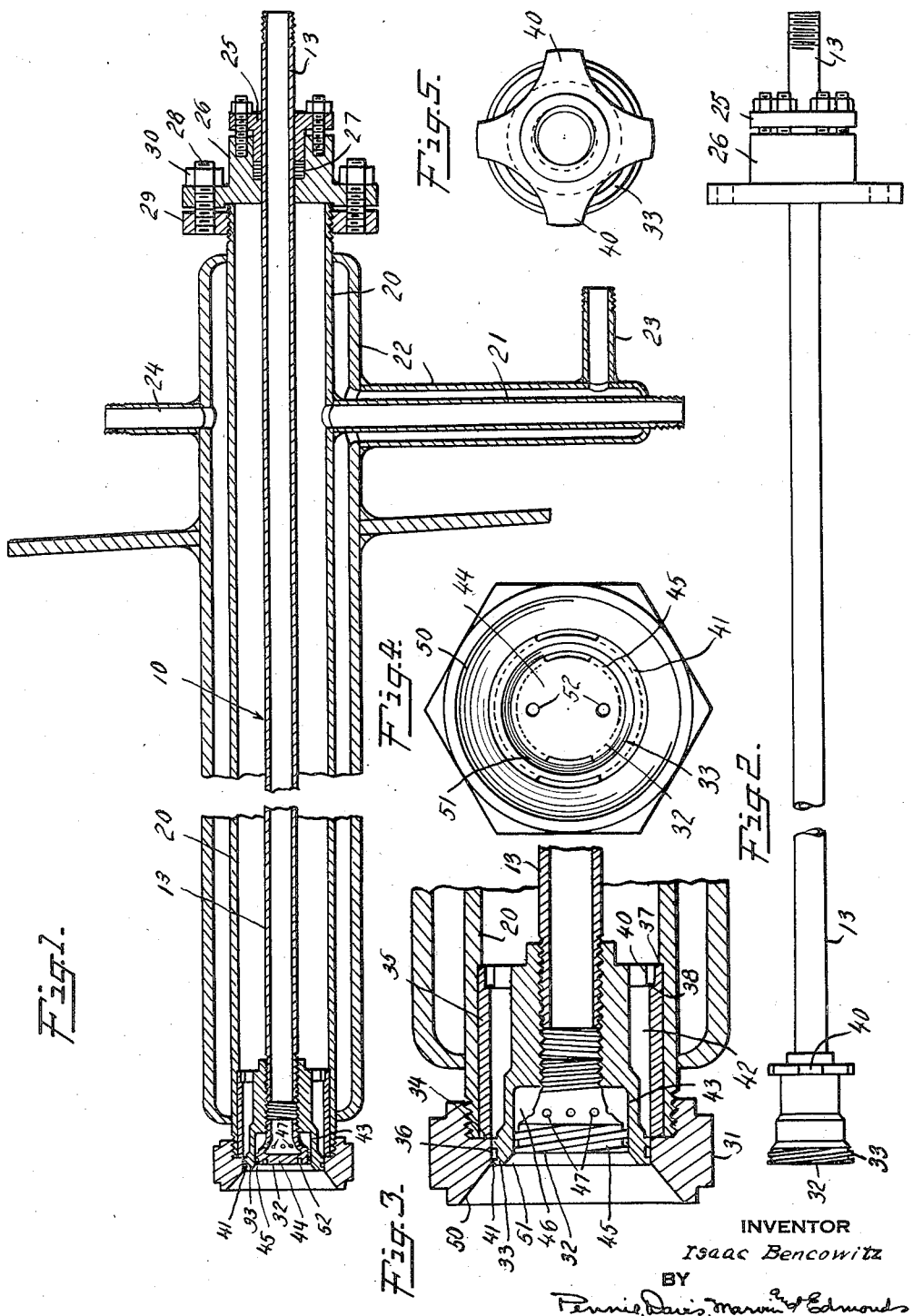
INVENTOR
Isaac Bencowitz
BY
Pennie Davis Marvin & Edmonds
ATTORNEYS Feb. 18, 1936.   I. BENCOWITZ   2,031,403
SULPHUR BURNER
Filed March 12, 1932   2 Sheets-Sheet 2
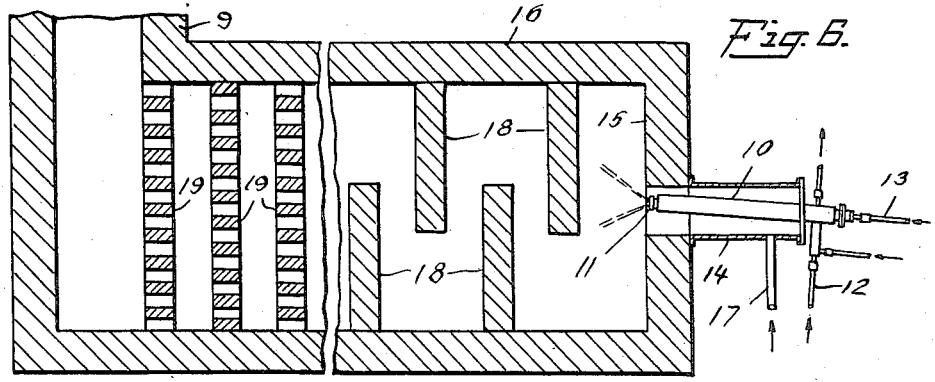
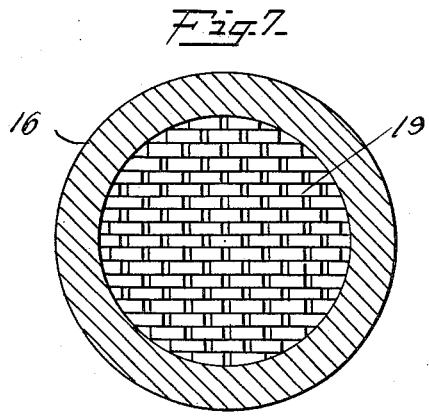
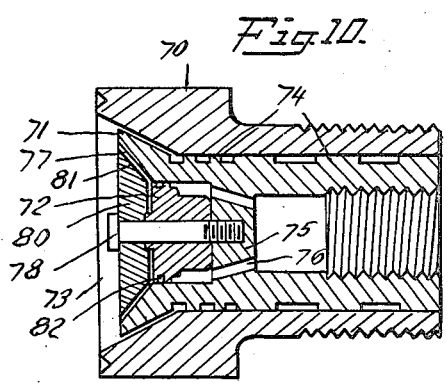
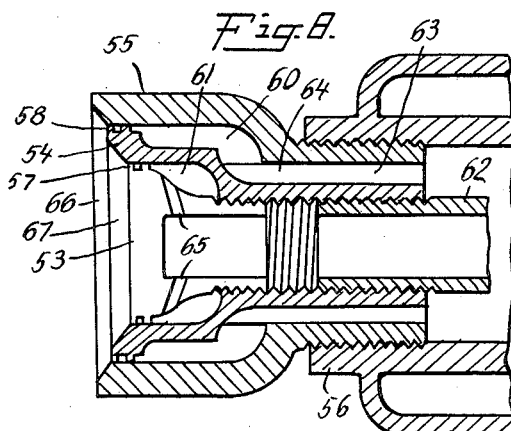
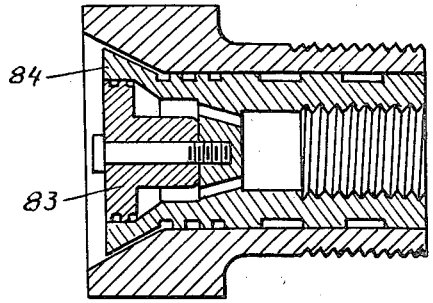
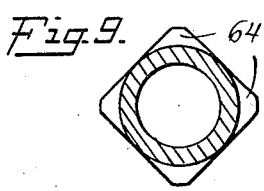
INVENTOR
Isaac Bencowitz
BY
Pennie, Davis, Marvin & Edmonds
ATTORNEYS Patented Feb. 18, 1936

2,031,403

UNITED STATES PATENT OFFICE 2,031,403

SULPHUR BURNER

Isaac Bencowitz, New York, N. Y., assignor to Texas Gulf Sulphur Company, a corporation of Texas Application March 12, 1932, Serial No. 598,528

3 Claims. (Cl. 23—179)

This invention relates to sulphur dioxide production and has for an object the provision of an improved method and apparatus for producing sulphur dioxide. More particularly, the invention contemplates the provision of an improved method and apparatus for burning elemental sulphur to produce sulphur dioxide. The invention further contemplates the provision of an improved burner for sulphur dioxide production.

Apparatus constructed in accordance with the invention comprises a combustion chamber and means for introducing air and a spray of finely divided or atomized sulphur into the combustion chamber. In the preferred form of apparatus of the invention, means are provided for directing a stream of high pressure gas such as air against a stream of molten sulphur in order to form the spray of finely divided or atomized sulphur. The combustion chamber employed in the apparatus of the invention is provided with a series of baffles for causing turbulence of gases therein and a large interior surface area for contact with the gas mixture.

In the operation of the apparatus of the invention, the air or other gas employed in forming the spray is preferably directed against the stream of molten sulphur in the form of a whirling current of high velocity. When air is employed for forming the spray of atomized sulphur, the amount employed is preferably insufficient to completely oxidize the sulphur to sulphur dioxide, the remainder of the required air being introduced into the combustion chamber separately. The operation is preferably so conducted as to compensate for the dilution and the large increase in the volume of gases caused by the vaporization and oxidation of the sulphur and expansion of the gases due to the heat caused by the oxidation.

The spray forming apparatus may comprise means for imparting whirling movements to both the molten sulphur and the gas employed in forming the spray. Thus, for example, the molten sulphur and the air or other gas may be passed through separate passages provided with worm threads adjacent their discharge ends. The preferred form of spray forming apparatus comprises a nozzle mounted in the adjacent ends of a pair of telescoping tubes or conduits and comprising telescoping worm screws. The spaces between the worm threads communicate with the passage in the inner tube and a passage formed between the two tubes. Means are provided for introducing air or other gas and sulphur into the inner tube and the passage between the tubes.

Air or other gas supply means are preferably connected to the inner tube and the construction of the nozzle is preferably such that whirling currents of air and sulphur are produced, the whirling current of air being formed interiorly of the whirling current of sulphur and crossing the path of the whirling current of sulphur beyond its point of formation. The construction of the nozzle may be such that the whirling masses rotate in the same direction or it may be such that the whirling masses rotate in opposite directions.

The invention will be better understood from a consideration of the following description in conjunction with the accompanying drawings, in which Fig. 1 is a sectional elevation of spray forming apparatus constructed in accordance with the invention;

Fig. 2 is a view of a portion of the burner of the apparatus illustrated in Fig. 1;

Fig. 3 is an enlarged sectional elevation of the nozzle of the apparatus illustrated in Fig. 1;

Fig. 4 is an elevation of the discharge end of the nozzle illustrated in Fig. 3;

Fig. 5 is a view showing the construction of the inlet end portion of the nozzle illustrated in Fig. 3;

Fig. 6 shows the apparatus of Fig. 1 applied to a combustion chamber;

Fig. 7 is a section through the combustion chamber illustrated in Fig. 6, showing an arrangement of checker brick-work for providing a large area of contact surface;

Figs. 8, 10, and 11 are longitudinal sections of modified forms of nozzles; and

Fig. 9 shows the shape of an element of the nozzle illustrated in Fig. 8.

The apparatus illustrated in the drawings (Fig. 6) comprises a spray device 10 provided adjacent one end with a nozzle 11 and adjacent the other end with conduits 12 and 13 for the introduction of molten sulphur and high pressure air, respectively from suitable sources of supply (not shown).

The spray device 10 projects through a casing 14 communicating with an opening in an end wall 15 of a combustion chamber 16 to a point adjacent the inner surface of the end wall. The casing 14 provides a passage for the introduction of air into the combustion chamber around a spray issuing from the nozzle 11. The casing is connected with a low-pressure fan or blower (not shown) by means of a conduit 17.

The combustion chamber is provided adjacent the firing or entrance end with a series of solid or imperforate baffles 18 arranged in staggered relationship and adjacent the discharge or exit end with a series of baffles 19 formed of checkerbrick work. The baffles 18 are substantially semicircular in shape and they are preferably so mounted that their curved surfaces lie in substantial contact with the inner curved surface of the combustion chamber. The arrangement of the baffles 18 is such that a tortuous path of travel is provided for the gases passing through the entrance or firing end portion of the combustion chamber. The baffles 19 are of such construction as to provide a large area of contact surface for the gases. An outlet flue 9 is provided for conducting gases from the combustion chamber to the point of use (not shown).

The spray device comprises an inner tube which forms a continuation of the conduit 13 and an outer tube 20 of greater diameter than the inner tube telescoping with the inner tube and mounted in axial alignment therewith, the walls of the inner and outer tubes being spaced apart to provide an annular passage therebetween. A short conduit 21 communicates with the passage between the tubes and with the supply conduit 12 to provide an inlet for molten sulphur. The major portions of the outer tube 20 and the sulphur supply conduit 21 are surrounded by a steam jacket 22 provided with inlet and outlet conduits 23 and 24 which are connected with suitable steam supply and exhaust means (not shown).

The opposite ends of the outer tube are threaded to receive a threaded end portion of the nozzle 11 and a threaded ring or flange 29. A gland comprising centrally bored male and female members 25 and 26 and an annular relatively soft packing element 27 is attached to the flange 29 by means of stud bolts 28 and nuts 30. The gland provides a seal for one end of the annular space between the inner and outer tubes.

The nozzle 11 comprises an outer substantially tubular casing 31 and telescoping quadruple worm screws 32 and 33. The central portion of the opening in the casing 31 has a smooth cylindrical surface 36 and it is of smaller diameter than the inside diameter of the outer tube 20. One end portion of the opening in the casing is enlarged and provided with internal threads for engagement with external threads on the outer tube 20. When the casing is mounted on the outer tube, the end of the outer tube engages an annular shoulder 34 between the central cylindrical surface 36 and the threaded surface of the casing. The nozzle supporting end portion of the outer tube is enlarged internally to receive a tubular filler 35 having an internal diameter substantially equal to the diameter of the cylindrical surface 36. The opposite ends of the tubular filler 35 engage the shoulder 34 and an annular shoulder 37 formed internally on the outer tube 20. The inner cylindrical surface of the tubular filler 35, when in position, forms a continuation of the inner cylindrical casing surface 36. An annular shoulder 38 is provided internally on the tubular filler 35 for engagement with spacing arms 40 formed integrally with the outer worm screw 33 adjacent one end.

The outer worm screw 33 is mounted within the nozzle casing 31 and the adjacent end portion of the outer tube 20 with the peripheral surfaces of the worm threads 41 in engagement with the cylindrical surface 36 and with the peripheral edges of the spacing arms 40 engaging the annular shoulder 38 on the tubular filler 35. The main body portion of the outer worm screw 33 is of smaller diameter than the internal diameter of the filler 35 and an annular passage 42 is formed between the filler and the worm screw when the nozzle is assembled.

The outer worm screw is bored centrally and threaded internally adjacent one end to receive threaded end portions of the inner tube 13 and the inner worm screw 32. The opposite end portion of the central opening is enlarged and provided with a smooth cylindrical surface 43 to receive an end portion of the inner worm screw 32. The inner worm screw 32 is in the form of a hollow tube comprising a relatively large cylindrical section and a relatively small cylindrical section joined by an intermediate frusto-conical section, the tube being closed at one end by means of a wall 44. The relatively small cylindrical section is provided with threads for engagement with the internal threads of the outer worm screw. The relatively large cylindrical section is provided with worm threads 45. The size of the relatively large cylindrical section and the arrangement of worm threads 45 thereon are such that the peripheral surfaces of the worm threads 45 engage the inner smooth cylindrical surface 43 of the outer worm screw when the inner worm screw is mounted in operative position within the outer worm screw. The construction of the inner and outer worm screws are such that an annular space 46 which communicates with the spaces between the worm threads 45 is formed. The frusto-conical intermediate section is provided with a series of apertures 47 extending through the wall thereof to provide means of communication between the interior of the inner worm screw and the annular space 46 formed between the walls of the frusto-conical section of the inner worm screw and the enlarged end portion of the outer worm screw.

The discharge end portions of the nozzle casing and the outer worm screw are beveled internally to provide surfaces 50 and 51 for controlling the directions of flow of the separate fluid streams issuing from the passages between the worm threads. The outer worm screw is so mounted with respect to the nozzle casing that the end faces of the worm threads thereon lie in a plane containing the inner end edge of the beveled surface 50 of the nozzle casing. The position of the outer end face of the inner worm screw relatively to the inner end edge of the beveled surface 51 of the outer worm screw may be adjusted by rotating the inner worm screw. Holes 52 to permit the insertion of prongs of a suitable tool for the purpose of rotating the inner worm screw are provided in the end wall 44.

The worm screw assembly may be removed from the apparatus for repair, cleaning, substitution of one or more elements or for any other purpose by releasing the nuts 30 which maintain the gland in proper relative position with respect to the flange 29 and withdrawing the air pipe 13. The assembly which may be thus withdrawn is shown in Fig. 2.

The nozzle shown in Figs. 8 and 9 comprises inner and outer worm screws 53 and 54 similar in most essential details to the inner and outer worm screws 32 and 33 of the apparatus shown in Figs. 1 and 3. The outer worm screw 54 is mounted within a hollow nozzle casing 55 having a reduced end portion threaded externally for engagement with internal threads of an outer tube 56 similar to the outer tube 20. The inner and outer worm screws are provided with worm threads 57 and 58, and they are so shaped that, when the nozzle is assembled, annular spaces 60 and 61 are formed between the outer worm screw and the nozzle casing and between the inner and outer worm screws.

The outer worm screw is mounted on an inner tube or air pipe 62 corresponding to the inner tube 13 extending into the central opening in the nozzle casing. The inner end portion of the outer nozzle is of smaller outer diameter than the inner diameter of the adjacent end portion of the nozzle casing, and, when the nozzle is assembled, an annular passage 63 is provided between the adjacent inner ends. Projections 64 (Fig. 9) which engage the inner surface of the nozzle casing are provided intermediate the ends of the outer worm screw for aiding in maintaining the inner ends of the nozzle casing and outer worm screw in properly spaced relationship. Apertures 65 in the wall of the inner worm screw provide means of communication between the interior of the inner worm screw and the annular space 61 surrounding the inner worm screw. The discharge end edge portions of the nozzle casing and the outer worm screw are beveled internally to provide surfaces 66 and 67 for controlling the direction of travel of the separate fluid streams issuing from the passages between the worm threads.

The nozzle shown in Fig. 10 comprises a substantially tubular casing 70 threaded externally adjacent one end for attachment to a suitable burner, an outer worm screw 71 mounted within the casing, and an inner worm screw 72 mounted within the outer worm screw. The major portion of the inner surface of the nozzle casing is substantially cylindrical, and the discharge end portion is beveled to provide a substantially frusto-conical surface 73. The outer worm screw is provided with worm threads 74 and it is so shaped that its outer peripheral surfaces conform in shape with the shape of the inner surfaces of the nozzle casing. The outer worm screw is provided at one end with a threaded opening for attachment to a suitable fluid supply conduit. The opposite end portion of the outer worm screw is provided with a recess having a cylindrical surface for the reception of the inner worm screw 72. A wall 75 disposed within the outer worm screw is provided with apertures 76 which provide means of communication between the recesses formed in the end portions of the outer worm screw.

The discharge end portion of the outer worm screw is beveled to provide a frusto-conical surface 77. The inner worm screw is held in position within the outer worm screw by means of a screw 78 extending longitudinally therethrough and through a washer 80 and entering a threaded opening in the wall 75. The washer 80 is provided with a surface 81 corresponding to the frusto-conical surface 77 of the outer worm screw. The casing, inner and outer worm screws and the washer are separable. In the assembled nozzle, the peripheral surfaces of the worm threads 74 of the outer worm screw and the peripheral surfaces of the worm threads 82 of the inner worm screw engages the inner cylindrical surfaces of the casing and outer worm screw. The arrangement of parts is such that two separate passages for the flow of fluids extend from the entrance end of the nozzle to the discharge end of the nozzle between the worm threads and the adjacent frusto-conical surfaces.

The nozzle shown in Fig. 11 is similar to that shown in Fig. 10, differing chiefly in that it does not include a washer or frusto-conical surface corresponding to the washer 80 and frusto-conical surface 77 of the nozzle of Fig. 10. The discharge end face of the inner worm screw 83 is substantially flush with the discharge end face of the outer worm screw 84.

When the apparatus is to be employed for the production of sulphur dioxide, the interior of the combustion chamber should be heated preliminarily as, for example, by means of a gas flame. In the operation of the apparatus, molten sulphur under any suitable pressure is introduced into the passage between the inner tube 13 and the outer tube 20 through the conduits 12 and 21 and flows longitudinally therethrough toward the discharge nozzle. Upon entering the discharge nozzle, the direction of flow is changed by the worm threads and the molten sulphur issues from the discharge nozzle in the form of a whirling stream. High pressure air, introduced into the inner tube 13, flows longitudinally therethrough until it reaches the discharge nozzle wherein its direction of flow is changed by the worm threads and it issues from the discharge nozzle as a whirling current. The relatively high-velocity whirling current of air upon striking the relatively low-velocity stream of molten sulphur produces a whirling spray comprising an intimate mixture of air and finely divided sulphur. The heat developed through oxidation of the sulphur during the course of the operation is sufficient to maintain the baffles and the walls of the combustion chamber at a temperature sufficiently high to cause rapid oxidation of the sulphur continuously. The amount of air introduced through the inner air tube 13 should be just sufficient to result in the production of a suitable whirling spray. Additional air for completing the oxidation of the sulphur to sulphur dioxide is introduced into the combustion chamber around the spray through the conduit 17 and the casing 14.

Immediately after entering the combustion chamber, the molten sulphur contained in the spray is vaporized and partially oxidized, and a large volume of gas comprising a mixture of sulphur vapor and air together with some sulphur dioxide is produced. In passing along the tortuous path formed by the staggered baffles in the entrance end portion of the combustion chamber, the gas body is agitated and the components are brought into intimate contact with one another, producing a substantially homogeneous gas body. The resulting gas body is filtered through the checker-brick structures in the discharge end portion of the chamber and the components are thus brought into intimate contact with highly heated solid surfaces. Oxidation of the sulphur commences immediately after it is introduced into the combustion chamber, proceeds during the period of mixing while the gases are passing along the tortuous path formed by the staggered baffles and is practically completed as the gases filter through the checker-brick structures.

The provision of baffle and checker-brick structures such as those shown in the drawings serves to compensate for the dilution and the large increase in the volume of the gases caused by the vaporization and oxidation of the sulphur and expansion of the gases due to the heat resulting from oxidation. Intimate contact of sulphur with oxygen in a heated atmosphere is achieved when the molten sulphur and air are introduced into the combustion chamber, but when vaporization occurs and as oxidation proceeds, contact of oxygen with sulphur at suitable reacting temperatures tends to become increasingly difficult because of the expansion of all of the gases and because of the diluent effect of the sulphur dioxide produced. The staggered baffle arrangement serves to mix the gases and bring the oxygen and sulphur into intimate contact and, at the same time, provides a relatively large heated solid surface for raising the gases coming in contact therewith to suitable reacting temperatures. The checker-brick structure provides means for heating substantially the entire body of the intimate mixture of gases formed by the action of the staggered baffles to suitable reacting temperatures. The checker-brick structure is such that a large proportion of the gas mixture is brought into intimate contact with the highly heated surfaces of the bricks forming the structure. The spacing of the bricks is preferably such that small passages for the gas in which the gas may be readily heated to suitable reacting temperatures by radiation of heat from the surfaces defining the passages are formed. In addition, and in order to further insure intimate contact of sulphur with oxygen, the passages in the checker-brick structures are staggered.

The various nozzles illustrated may be used interchangeably with suitable modifications in apparatus of the type illustrated in Figs. 1 and 6. Nozzles of any suitable sizes may be employed. Nozzles having dimensions substantially the same as those of the nozzles illustrated in the drawings have been employed successfully. Employing apparatus provided with a nozzle similar to those illustrated, I have succeeded in burning sulphur at the rate of three and one-half to ten tons per day to produce a gas running consistently 19% to 21% sulphur dioxide. The gas leaving the combustion chamber was practically colorless showing a low content of sublimed sulphur. The apparatus which was capable of being operated to burn efficiently three and one-half to ten tons of sulphur per day was also capable of being regulated to burn efficiently as little as a few pounds of sulphur per hour.

The flexibility of the apparatus of the invention with respect to capacity may be attributed to the fact that the success of the operation is not dependent upon the pressure or volume of the molten sulphur provided. The primary factor in producing the finely divided spray is the air or other gas employed. I have found it to be advisable to employ a gas such as air under a pressure of about forty to eighty pounds per square inch. In the operation of the apparatus of the invention, the desired type of spray is obtained primarily as a result of the use of high pressure air or other oxidizing gas and the efficiency of the apparatus is due not only to the fine subdivision of the sulphur but also to the intimacy with which the air or other oxidizing gas and the sulphur leaving the nozzle are mixed.

Molten sulphur for use in operating the apparatus may be produced in any suitable manner. Heat for melting the sulphur and for providing steam for use in the steam jacket 22 may be obtained from the gases leaving the combustion chamber by means of suitable heat exchanging apparatus (not shown).

In order to obtain the optimum results in the operation of the apparatus of the invention, it may be desirable to employ dry air or air of low water content and to regulate carefully the relative amounts of sulphur and oxygen admitted to the combustion chamber. Water and excess free oxygen tend to promote the production of sulphur trioxide at elevated temperatures. Air for use in the operation of the apparatus may be dried by means of sulphuric acid, and suitable drying apparatus may be provided as a part of the complete apparatus of the invention. Such apparatus may comprise, for example, a packed tower through which air and sulphuric acid may be passed in countercurrent relationship. Means may be provided for cooling the gases issuing from the combustion chamber to reduce the tendency of the sulphur dioxide to react with free oxygen and water vapor which may be associated therewith. Such cooling means may be a heat exchanger in which the heat removed from the gases may be employed for melting elemental sulphur and for producing steam for use in the process.

I claim:—

1. The method of producing sulphur dioxide which comprises spraying molten sulphur and oxygen in independently regulable quantities into a heated combustion chamber, simultaneously agitating the sulphur and oxygen to effect intimate mixing thereof, passing the resulting mixture along a tortuous path in the heated combustion chamber to oxidize the sulphur, and subsequently passing the mixture of gases through heated checkerbrick to cause intimate contact of the components of the mixture with heated solid surfaces.

2. Sulphur burning apparatus comprising a combustion chamber, means for introducing a stream of molten sulphur into the combustion chamber, means for directing a whirling current of air against the stream of molten sulphur to form a spray comprising an intimate mixture of finely divided sulphur and air, means for withdrawing gases from the combustion chamber, means defining a tortuous path of travel for gases within the combustion chamber adjacent the firing end, and means adjacent the discharge end for causing intimate contact of gases passing through the combustion chamber with heated solid surfaces.

3. Sulphur burning apparatus comprising a combustion chamber, means for introducing a stream of molten sulphur into the combustion chamber, means for directing a whirling current of air against the stream of molten sulphur to form a spray comprising an intimate mixture of finely divided sulphur and air, means for withdrawing gases from the combustion chamber, staggered baffles defining a tortuous path of travel for gases within the combustion chamber adjacent the firing end, and a checkerbrick structure disposed in the path of travel of gases passing through the combustion chamber adjacent the discharge end.

ISAAC BENCOWITZ.